United States Patent
Hottori et al.

(10) Patent No.: US 6,492,059 B1
(45) Date of Patent: *Dec. 10, 2002

(54) SEPARATOR FOR SEALED LEAD-ACID BATTERY

(75) Inventors: Takashi Hottori, Toyohashi (JP); Akihiro Taniguchi, Kosai (JP); Kazunari Ando, Kosai (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/898,533

(22) Filed: Jul. 22, 1997

(30) Foreign Application Priority Data

Jul. 23, 1996 (JP) ............................................. 8-193189

(51) Int. Cl.⁷ .............................. H01M 2/16; H01M 2/18
(52) U.S. Cl. ........................ 429/136; 429/144; 429/251; 429/252
(58) Field of Search ................................. 429/132, 133, 429/136, 140, 141, 142, 144, 247, 254, 251, 252, 249

(56) References Cited

U.S. PATENT DOCUMENTS

| | | | | |
|---|---|---|---|---|
| 3,265,535 A | * | 8/1966 | Sundberg | 136/54 |
| 3,476,612 A | * | 11/1969 | Tench | 136/147 |
| 3,956,020 A | * | 5/1976 | Weininger et al. | 136/146 |
| 3,972,728 A | * | 8/1976 | Sundberg et al. | 136/43 |
| 4,091,185 A | * | 5/1978 | Chireau et al. | 429/144 |
| 4,215,186 A | * | 7/1980 | Jaeger | 429/139 |
| 4,309,494 A | * | 1/1982 | Stockel | 429/254 |
| 4,373,015 A | * | 2/1983 | Peters et al. | 429/57 |
| 4,414,295 A | * | 11/1983 | Uba | 429/59 |
| 4,440,838 A | * | 4/1984 | Schmidt | 429/250 |
| 4,444,854 A | * | 4/1984 | Hooke | 429/94 |
| 4,629,622 A | * | 12/1986 | Yonezu et al. | 429/57 |
| 4,652,505 A | * | 3/1987 | Komaki et al. | 429/131 |
| 4,804,598 A | * | 2/1989 | Jackovitz et al. | 429/254 |
| 5,075,183 A | * | 12/1991 | Yamaguchi et al. | 429/139 |
| 5,075,184 A | * | 12/1991 | Tanaka et al. | 429/144 |
| 5,209,993 A | * | 5/1993 | Mix | 429/136 |
| 5,213,722 A | | 5/1993 | Iwasaki et al. | 264/22 |
| 5,376,477 A | * | 12/1994 | Aidman et al. | 429/141 |
| 5,470,676 A | * | 11/1995 | Nakano | 429/139 |
| 5,716,734 A | * | 2/1998 | Nakano | 429/143 |

FOREIGN PATENT DOCUMENTS

| | | |
|---|---|---|
| EP | 0316916 | 5/1989 |
| EP | 0680105 | 11/1995 |
| JP | 63019772 | 1/1988 |
| JP | 63-252354 | * 10/1988 |
| JP | 06267582 | 9/1994 |
| JP | 7-34555 | 6/1995 |
| JP | 7-60676 | 6/1995 |

* cited by examiner

*Primary Examiner*—Patrick Ryan
*Assistant Examiner*—Jonathan Crepeau
(74) *Attorney, Agent, or Firm*—RatnerPrestia

(57) ABSTRACT

A sealed lead-acid battery includes a separator made from hydrophilic treated sheet made from synthetic fiber which wraps at least either one of a positive electrode and a negative electrode. A mat type separator made from fine glass fiber is disposed between the wrapped electrode and its opposite electrode. This structure is adopted in a battery which uses a paste type electrode where an expanded grid having no outer frame on both edges is used, thereby prolonging cycle life even after cycling of charge and deep discharge.

6 Claims, 5 Drawing Sheets

SEPARATOR FOR SEALED LEAD-ACID BATTERY

FIELD OF THE INVENTION

The present invention relates to a sealed lead-acid battery, and more particularly to a separator thereof which prevents an internal short-circuit and thereby realizes a longer-life battery.

BACKGROUND OF THE INVENTION

In general, a discharge reaction of the lead-acid battery produces lead sulfate ($PbSO_4$) through electrochemical reduction and oxidation of lead dioxide($PbO_2$) and lead(Pb) in sulfuric acid ($H_2SO_4$) electrolyte solution; where $PbO_2$ and Pb are active materials of positive and negative electrodes. The produced $PbSO_4$ on the positive and negative electrodes is electrochemically reduced as well as oxidized by charging, thereby not only producing $PbO_2$ and Pb, but also revitalizing $H_2SO_4$. The overall reaction of charge/discharge of the lead-acid battery is described as the following formula (1):

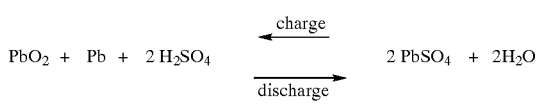

(1)

The following characteristics are desirable for the separator of the lead-acid battery:

1. Acid-resistant, anti-oxidation and anti-reduction:

Since strong-acid $H_2SO_4$ may be used as electrolyte, and also, electrochemical oxidation as well as reduction is repeated on both the positive and negative electrodes through charging and discharging processes, a chemically stable material from which a harmful substance is not soluble should be selected.

2. High ion-conductivity and no possibility of internal short-circuit due to contact between the positive and negative electrodes:

Electrolyte is easy to permeate and diffuse through the separator disposed between the positive and negative electrodes because hydrogen ion $H^+$ and sulfate ion $SO_4^{-2}$ are of electrolytic dissociation in the electrolyte together with active materials $PbO_2$ and Pb of the positive and negative electrodes and are reaction species, whereby the separator is vulnerable to be permeated as well as diffused with the electrolyte. In order to avoid contact between the positive and negative electrodes, it is desirable for the separator to be long and bent in shape, and to have a micro-porous construction. Particles in the active materials of the positive electrode, by charge/discharge cycling, tend to drop from an electrode grid which is an electric collector and active material holder. Thus caution is desirable to avoid this particle drop. To be more specific, a micro-porous sheet made of rubber or resin, and pulp or glass-fiber reinforced with resin, is used as the separator.

A paste type electrode plate process which is in high productivity is widely used, among others, in the lead-acid batteries. When using this type, a synthetic resin sheet having the micro-pore structure and a glass mat are used for the separator. The glass mat is in contact with both sides of the positive electrode, thereby preventing the active material of the positive electrode from dropping. As a result, the number of internal short-circuits is reduced. This example is substantially effective when the electrode plate is used in a vented type car battery which is exposed to violent external forces such as vibration, shock, and acceleration.

Recently, Japanese utility model H07-34555 discloses another idea as follows which further reduces the internal short-circuit. An envelope type separator made from micro-porous synthetic resin sheet includes a glass mat which is broader than the separator, being laid on the separator, wherein the separator is folded so that side portions of the synthetic resin sheet may contact each other. Both edges where the synthetic resin sheet side portions are contacting and the outer edges of the glass mat adhere in order to form an envelope.

This separator is also developed to be used in a vented type battery, where the negative electrode is accommodated into the envelope, and the positive electrode is disposed to contact an outer surface of the glass mat. The electrode group thus formed is incorporated in a cell container, thereby forming the cell.

In order to make maintenance of the lead-acid battery easy, a sealed lead-acid battery has been widely used. Oxygen ($O_2$) gas generated from the positive electrode by over-charging is eliminated by an oxygen cycle reaction on the negative electrode. The same process is seen also in a sealed nickel-cadmium battery.

The separator of the sealed lead-acid battery desirably has the following functions other than the above:

(a) $O_2$ gas, generated from the positive electrode during a period between an end of charging and over-charging of the positive electrode, flows to the negative electrode with ease because of excellent ventilation, and the electrolyte is prevented from being fluid.

(b) The electrolyte pertinent to charge/discharge is retained as much as possible around the positive and negative electrodes.

In order to turn the electrolyte to a non-fluid condition, two methods are available:

(1) Retainer method: The electrolyte is absorbed into the positive and negative electrodes as well as the separator so that the electrolyte turns into the pore of solid substance.

(2) Gelled method: The electrolyte turns into gell with colloidal silica.

The retainer method is now mostly used, and it is sometimes called "Absorbed method" or "Starve method." The retainer method adjusts a quantity of the electrolyte so that ventilation works in some part when the electrolyte is absorbed into the mat type separator and turned into solid. A mat sheet made from fine glass fiber is widely used as a separator satisfying the above functions. This separator made from the mat type glass fiber is a kind of non-woven cloth that can include short fibers made of borosilicate glass having a diameter of not more than 1 $\mu$m.

FIG. 3 shows a typical structure of an electrode group used in a conventional sealed lead-acid battery. Mat type glass fiber separator 3 is folded to form a U-shape, and negative electrode 1 is inserted therein, then the outer side of the folded separator 3 is nipped by positive electrode 2, and whereby the electrode group is formed.

When using electrodes of the same dimension, a number of plates is increased in step with capacity, and the electrode group is formed in the same manner. In general, the number of negative electrodes 1 is larger than that of positive electrodes 2 by one. The electrode group is accommodated into the cell container, and the most appropriate quantity of electrolyte is poured therein. Finally, the cell container and its cover are sealed to complete the cell.

In this case, the separator 3 is shaped longer than both sides and upper ends of the negative electrode 1 and positive electrode 2 in order to avoid an internal short-circuit. This structure finds no problem when used in a battery of small size, relatively low capacity, and the positive and negative electrodes with a casting grid having an outer frame; however, when used in a car battery or an electric vehicle (EV) battery, they are relatively high capacity, and in a sealed lead-acid battery, internal short-circuits sometimes occur, because these batteries are exposed to violent outer forces such as vibration, shock, and acceleration. When an expanded grid which has no outer frame on both edges is used in the electrodes, an internal short-circuit often occurs particularly in cycling of charge and deep discharge, because the active materials expand in step with increasing cycles of charge/discharge, which expands an edge of the positive electrode to overgrow the edge of the separator, and whereby the positive electrode makes contact with the negative electrode.

The envelope type separator of which both sides are sealed has been thus proposed in order to solve the above problem; however, it has been difficult to tie both edges of the separator comprising a mat type sheet made of glass fiber while keeping high productivity. Thus felt type non-woven cloth is adopted, which is made from acid proof and thermoplastic synthetic fiber such as polyester or polypropylene, and fine powder of acid clay as well as fine glass fiber mixed therein. Namely, the felt-type non-woven cloth of which dimension is large enough to fold the electrodes therein is doubled-back to form a U-shape, and both edges thereof are heat-sealed to make the envelope type separator. Then the electrode is inserted into this envelope. An example of this method is disclosed in Japanese Patent Laid-open H07-60676, where an envelope separator is used, which comprises felt-type non-woven cloth made from thermoplastic synthetic fiber such as polypropylene and fine glass fiber evenly dispersed therein. Although this separator has two advantages including (a) retaining electrolyte and (b) good heat-sealing, it has less ability of retaining electrolyte than the mat-type separator purely made from glass fiber, and yet, ventilation is not enough since the diameter of synthetic fiber is in general larger than that of glass fiber. While increasing the glass fiber content in order to improve the retainability of electrolyte, tightness of heat-sealing lowers, i.e. these two factors are in a trade-off relation. Therefore, the separator disclosed in H07-60676 does not work well in a sealed lead-acid battery with the glass fiber content of 10–25 wt % defined in H07-60676.

SUMMARY OF THE INVENTION

A separator made from hydrophilic treated synthetic fiber surrounds at least one of a positive and a negative electrode, and another separator made from fine glass fiber is also used. This structure results in the following advantages:

(a) Electrolyte between the positive and negative electrodes does not dry up.

(b) The separator made from hydrophilic treated synthetic fiber non woven and thermoplastic cloth can be shaped into an envelope or a tube by a heat-sealing method. Therefore, even when charge and deep discharge is cycled in a battery using an expanded grid which does not have an outer frame, an internal short-circuit is prevented. Thus, the present invention can prolong the life of a sealed lead-acid battery of which capacity is comparably large, such as a car battery and an EV battery.

DETAILED DESCRIPTION OF THE PREFERRED EMBODIMENTS

Figure 1A:
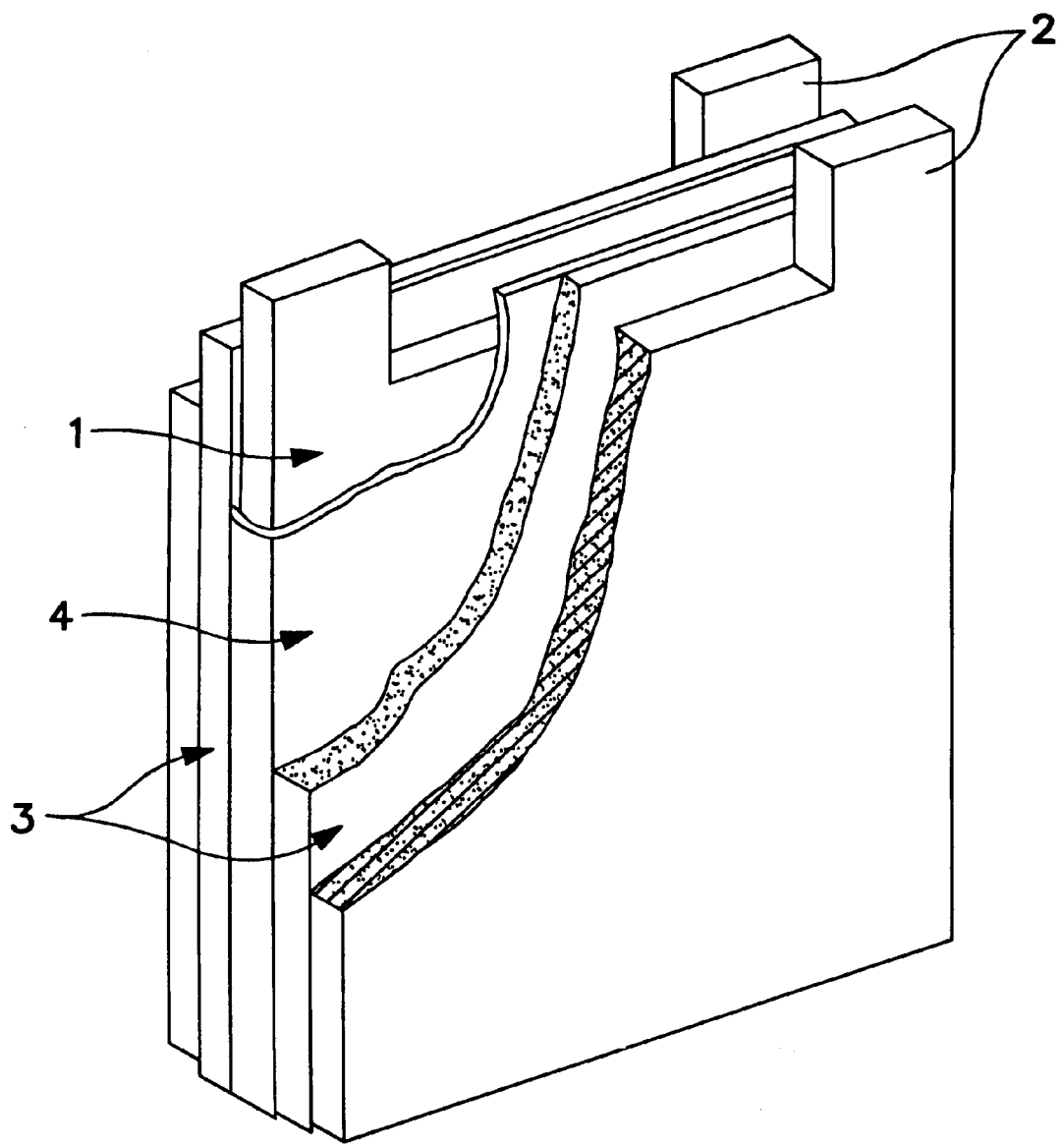
FIGS. 1(a)–1(b) are perspective views and FIG. 1(c) is a side view of an electrode group used in the sealed lead-acid battery, respectively, according to Exemplary Embodiments 1–3 of the present invention.

The present invention is now detailed by referring to the drawings and tables.

Exemplary Embodiment 1

FIG. 1(a) is a perspective view of an electrode group used in the sealed lead-acid battery according to the present invention. In FIG. 1(a), negative electrode 1 is located within separator 4 and is shaped like an envelope. The separator 4 may be hydrophilic treated non-woven cloth made from a mixture of (a) polyethylene(PE) fiber and (b) polypropylene (PP) fiber. Two pieces of separator 3 (which may be a mat sheet in which the fibers run in random directions) made from fine glass fiber having a diameter of about 0.8 $\mu$m are in contact with both sides of the envelope, and positive electrode 2 is in further contact with the outside thereof, thereby forming an electrode group. The negative electrode 1 and the positive electrode 2 are electrode plates (for example, paste type) using an expanded grid made from a Pb-Ca group alloy. The non-woven cloth mixed with PE and PP is dipped in fuming sulfuric acid, thereby sulfonating the surface thereof, thus the hydrophilic treatment is provided to the non-woven cloth. After this treatment, the non-woven cloth is washed with water and is dried. Then the non-woven cloth mixed with PE and PP is doubled back to form a "U" shape, and facing edges of both faces are heat-sealed to form an envelope. An exemplary separator made from hydrophilic treated non-woven cloth has a pore size of 4–27 $\mu$m and 0.2 mm in thickness of the cloth, while the mat type separator made from glass fiber is 1.0 mm in thickness. These thickness values are measured when a pressure of 20 kg/dm$^2$ is applied.

Negative electrode 1, positive electrode 2, envelope separator 4 made from hydrophilic treated synthetic fiber non-woven cloth, and mat type separator 3 made from glass fiber are used to produce an exemplary sealed lead-acid battery A in accordance with the present invention, of which the nominal capacity is 60 Ah at a 3 hour-rate, and the nominal voltage is 12V having a mono-block with 6 cells.

For a comparison purpose, the following two conventional type sealed lead-acid batteries B and C are produced.

Battery B comprises a mat-type separator made from glass fiber, of which the thickness is 1.2 mm, and Battery C comprises micro porous PE sheet of which the average pore size is 3.0 $\mu$m and the thickness is 0.5 mm. The mat type separator has a thickness of 0.7 mm. Materials other than the separator of batteries B and C are the same as those of battery A. The structure of the three batteries mentioned above are listed in Table 1.

TABLE 1

| Battery | Separator | |
|---|---|---|
| Type | Type | Thickness* |
| A of exemplary Embodiment 1 | hydrophilic treated PE, PP non-woven cloth (envelope type), mat glass fiber | 0.2 mm 1.0 mm |
| B of conventional type 1 | mat glass fiber | 1.2 mm |
| C of conventional type 2 | micro porous PE sheet (envelope type) mat glass fiber | 0.5 mm 0.7 mm |

*The values are measured at 20 kg/dm²

A specified quantity of $H_2SO_4$ electrolyte is poured into the above batteries at ordinary temperature, and the battery container is sealed after receiving an initial charge (formation.) Then, each battery is discharged with 1/3 C (20A) constant current at 25° C. down to 9.9V. After each battery is charged at 25° C., each battery is discharged again with 2.5C (150A) constant current. The result of this initial capacity test is shown in Table 2. The discharged capacity is measured at a relative value based on Battery B=100.

TABLE 2

| Battery type | Discharge with 1/3C | Discharge with 2.5C |
|---|---|---|
| A | 100 | 100 |
| B | 100 | 100 |
| C | Not discharged | Not discharged |

Regarding "charging", a two-step constant current charging method is adopted, i.e. charging each battery with 1/5C (12A) constant current until a terminal voltage reaches 14.4V, then switching the constant current to 1/20C (3A) and charging each battery again for four hours.

Table 2 proves that the battery A of the present invention has a performance at a low-rate (1/3C) discharge and a high-rate (2.5C) discharge like that of the battery B having a separator made from mat glass fiber and featuring an excellent discharge performance.

On the other hand, the battery C adopting the envelope type separator together with the mat glass fiber separator cannot discharge even at a low-rate (1/3C) after formation in the battery container, and thus data is not measured. The battery C cannot discharge at the high-rate (2.5C) either. The reason may be insufficient diffusion of electrolyte between the positive and negative electrodes because the electrolyte in the separator, which is directly in contact with the positive electrode and is made from micro porous PE sheet shaped in the envelope, dries up. The electrolyte becomes starved due to sealing the battery, and the electrolyte is retained by the mat glass fiber separator. The separator used in the battery C is effective for a vented type battery which exists with ample electrolyte; however, it is not recommended for the sealed type battery.

Figure 2:
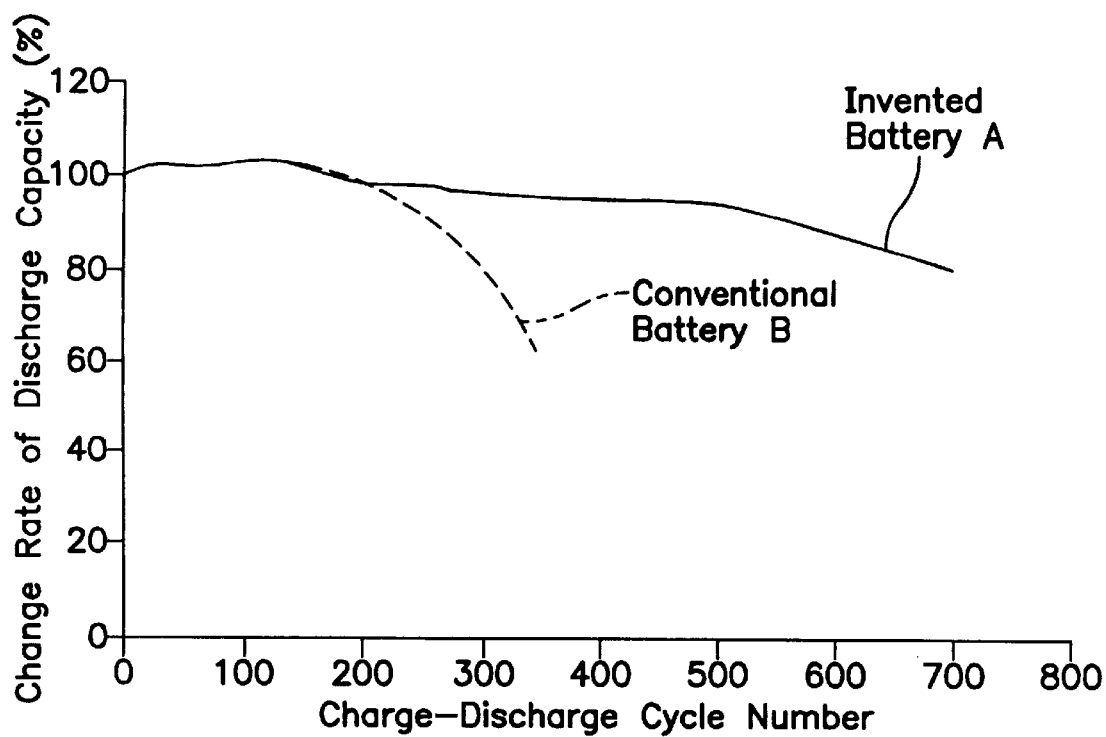
FIG. 2 compares the cycle lives between a conventional sealed lead-acid battery and a battery according to the present invention.
Figure 3:
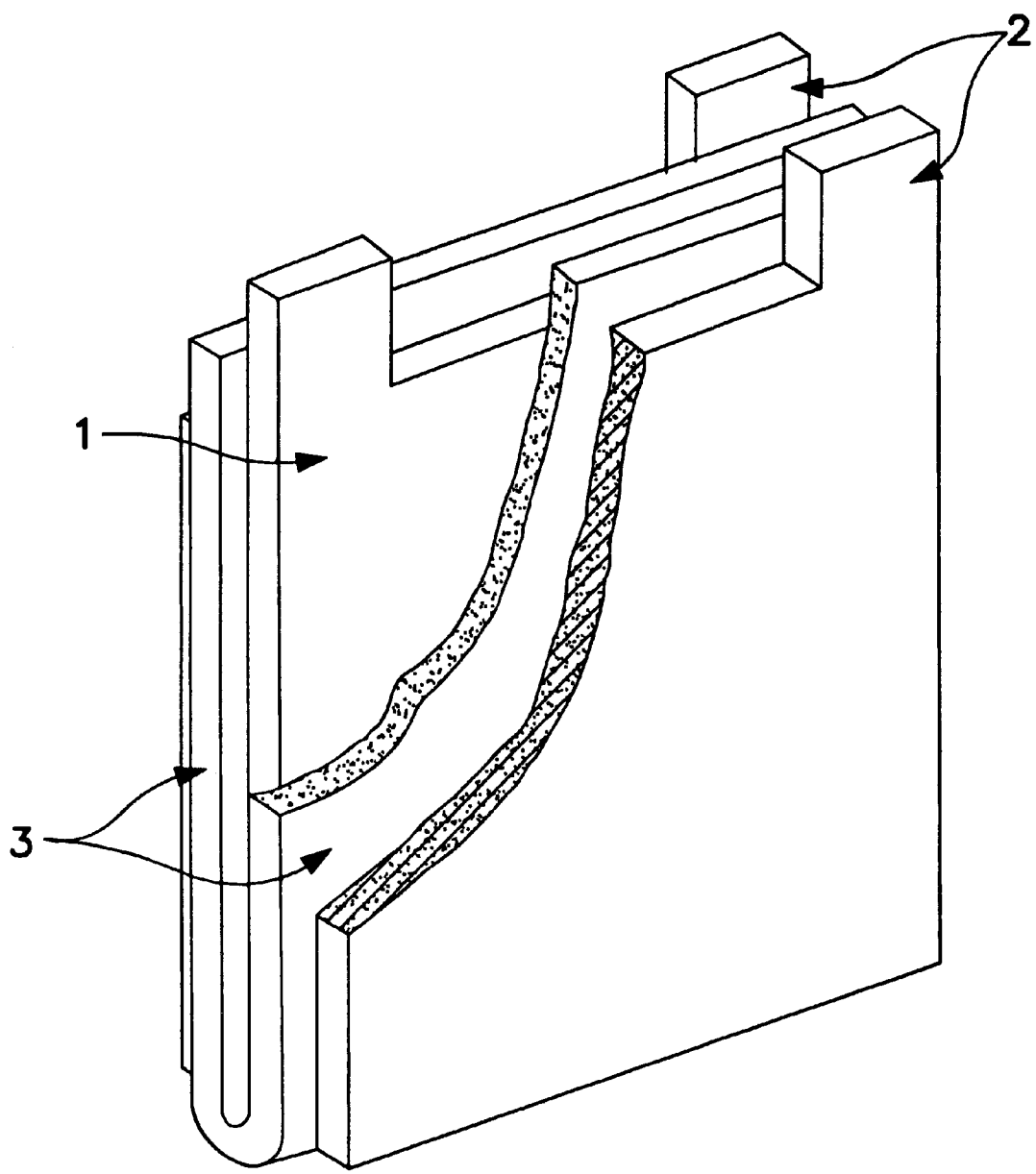
FIG. 3 is a perspective view of an electrode group used in a conventional sealed lead-acid battery.

The inventors tested the battery A of the present invention and the conventional battery B for cycle life by cycling the above mentioned charging and discharging at the low-rate (1/3C), where an end voltage is 9.9V and a test temperature is 25° C. The test result is shown in FIG. 2.

The capacity of the battery A reduces a bit until charge/discharge reaches 500 cycles, and then the capacity is reduced slightly. When 80% of the is initial capacity (when the cycle hits 700) is reached, the test is ended. In the meantime, battery B, which shows approximately the same initial performance as battery A, reduces its capacity remarkably after 200 cycles, and reaches 80% of the initial capacity at 300 cycles, and finally an internal short-circuit occurs at 350 cycles. The battery B thus cannot be recharged. The battery B is disassembled to find that a grid of the positive electrode extends and touches the active material which has overgrown from both edges of the positive electrode and the negative electrode, and the internal short-circuit occurs.

Exemplary Embodiment 2

Figure 1B:
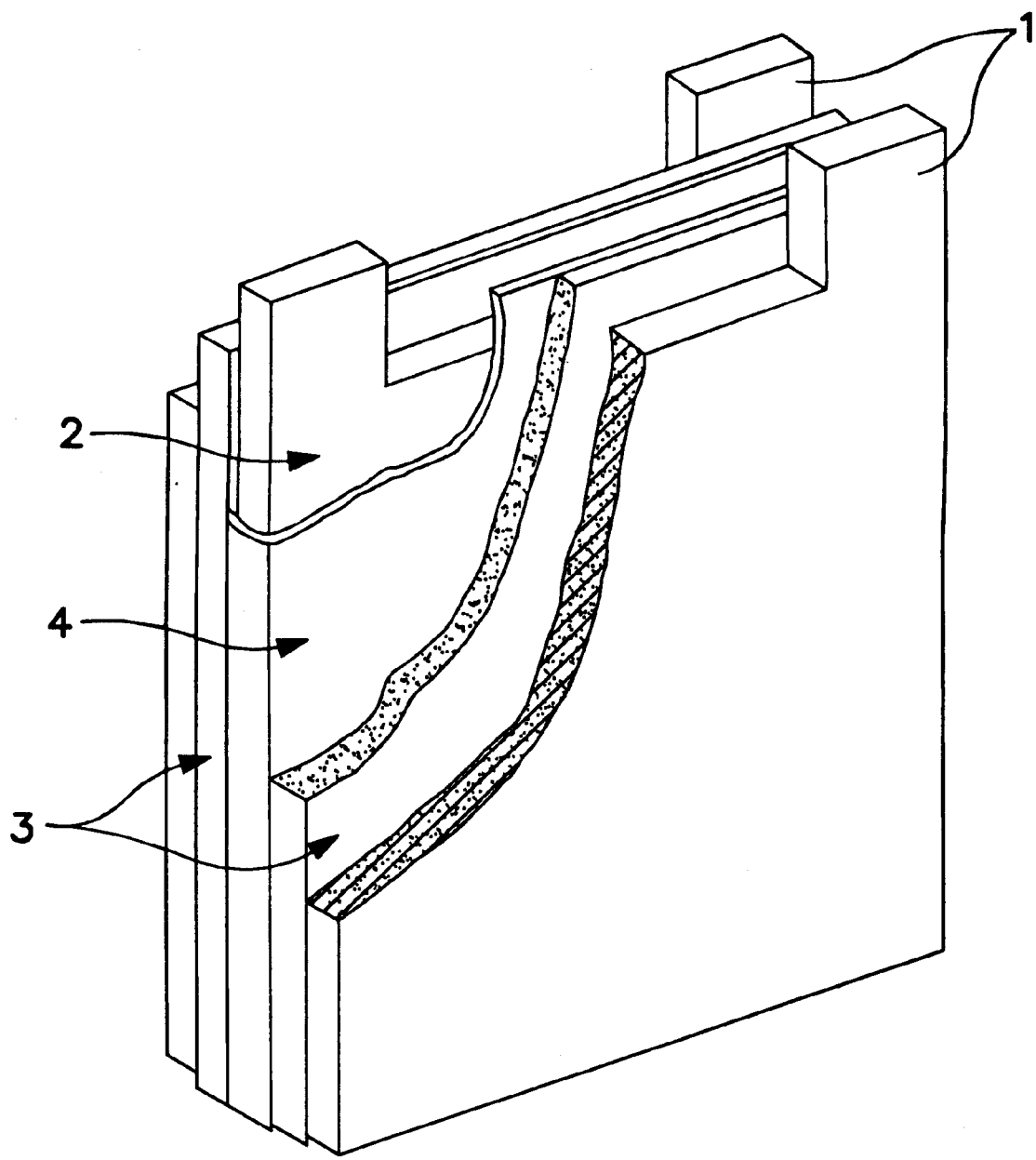

The same materials as used in Embodiment 1 are used in Embodiment 2, i.e. the envelope type separator comprising the positive and negative electrodes and hydrophilic treated sheet (e.g. non-woven cloth) made from synthetic fiber, and the separator (e.g. mat type) made from fine glass fiber. As shown in FIG. 1(b), the positive electrode 2, which differs from Embodiment 1, is situated in the envelope type separator comprising hydrophilic treated non-woven cloth 4 made from synthetic fiber. The mat type separator 3 made from glass fiber is on both sides of the envelope type separator, and negative electrode 1 is further in contact with the outside thereof, so that the electrode group can be formed. This electrode group is adopted into an exemplary battery D in accordance with the present invention. The initial capacity and cycle life of the battery D are approximately the same as those of the battery A. The battery D and the battery B of conventional type are tested for pass-through of foreign matter attached to the electrodes by a vibration test. The foreign matter, a notched piece of the positive electrode 2 having, for example, a size of 0.7 mm, is intentionally left on the electrodes in forming the electrode group when the batteries are produced.

The electrolyte is poured, initial charge (formation) is completed, and the battery containers are sealed. After the initial capacity test is completed, the batteries are charged, and the following vibration test is applied to these batteries D and B:

Acceleration=3.5G, Sweep speed=1 Hz/sec, Frequency range=10–60 Hz (sweep this range repeatedly)

In the battery B, an internal short-circuit occurs in approximately 100 hours when the test starts. The battery B is disassembled to find that the active material of the positive electrode has passed through the mat type separator made from glass fiber. The active material from the positive electrode permeates into the mat type separator whose thickness is 1.2 mm by its half thickness in depth and in almost the entire area, and the internal short-circuit is found where a notched piece of active material is intentionally left on the positive electrode. On the other hand, the internal short-circuit does not occur in 400 hours after starting the vibration test in the battery D. The battery D is disassembled when 400 hours have passed to find that there is little damage due to the permeation of the active material into the mat type separator. The envelope type separator comprising hydrophilic treated non-woven synthetic fiber may prevent the permeating of active material from the positive electrode.

The above embodiment proves that the battery, where the envelope type separator comprises hydrophilic treated non-woven synthetic fiber that surrounds the positive or negative electrode therein, and where the mat type separator made from glass fiber is disposed between the opposite electrode and the envelope type separator, can not only maintain the same discharging performance as the conventional battery which uses purely the mat type separator made from glass fiber, but also realizes a reduction of internal short-circuits, and thereby the cycle life of the battery is dramatically prolonged.

In Embodiments 1 and 2, either one of the positive or negative electrode is accommodated into the envelope type separator made from hydrophilic treated non-woven cloth made from synthetic fiber; however, if possible, both of the positive and negative electrodes may be accommodated into the above envelope type separator, and the mat type separator made from glass fiber may be disposed between these two electrodes. This structure can further prolong the cycle life.

Exemplary Embodiment 3

Figure 1C:
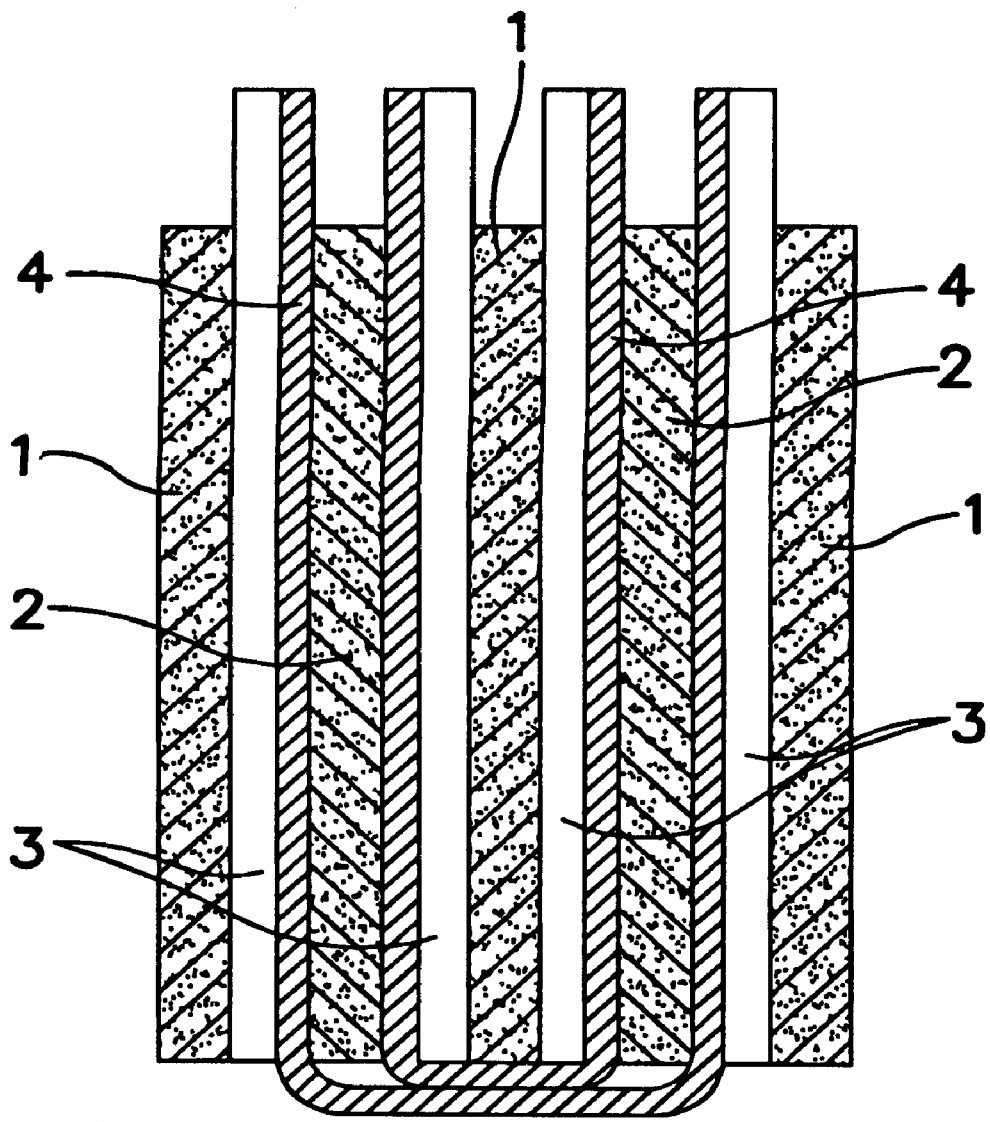

There is another method to obtain a similar effect as in Embodiments 1 and 2: As shown in FIG 1(c), two electrodes (shown as positive electrodes 2) or two electrodes having mat type separators made from glass fiber (not shown) are inserted into a tubular separator comprising hydrophilic treated non-woven cloth 4 made from synthetic fiber so that each lower end of the two electrodes may be adjacent, then the tubular separator is doubled back to form a "U" shape. Next, the opposite polar electrode to those in the tubular separator (shown as negative electrode 1) is disposed to contact with the inside and outside of the "U" shape. The opposite polar electrode disposed to contact the "U" shaped tubular separator can have a mat type separator 3 made from glass fiber which contacts the "U" shaped tubular separator, as shown in FIG. 1(c). The mat-type separator 3 can comprise a piece positioned adjacent to each of the facing surfaces of the negative electrode 1, as shown in FIG. 1(c). Alternatively, the mat-type separator can be formed from one piece that is folded into position adjacent to the facing surfaces of the negative electrode. An electrode group so structured can produced the same effect as Embodiments 1 or 2.

In the above embodiments, a sulfonating method is adopted for hydrophilic treatment; however, other methods such as graft polymerization, oxidation, and plasma irradiation are available, and as far as those methods can change the surface property of synthetic fiber to a hydrophilic property, those methods also can be adopted.

In the above embodiments, the non-woven cloth made from synthetic fiber is used, and the cloth is produced by mixing PE and PP. The material used in this embodiment is not limited to the non-woven cloth, but woven cloth can be also used. Other synthetic fiber materials such as polyvinyl chloride, polyethylene terephthalate, polyethylene, polypropylene, or a mixed product of those materials can be used, as far as the materials satisfy those properties such as being acid-proof, withstanding the electrochemical oxidation and reduction, and preferably thermoplastic. The hydrophilic treated and thermoplastic cloth made from synthetic fiber can be formed into the envelope type separator with ease by doubling-back the cloth to form a "U" shape and then heat-sealing the facing edges, and also can be formed into the tubular separator with ease by doubling-back the cloth to form a "U" shape and heat-sealing the opposite ends to the fold. The thickness of the above cloth is 0.1–0.7 mm, and the mat type separator made from glass fiber can be most effectively used provided its thickness ranges from 2.0 to 0.5 mm.

As detailed in the above embodiments, the positive or negative electrodes are wrapped in the envelope type separator comprising the hydrophilic treated cloth made from synthetic fiber which is used together with the mat type separator made from glass fiber, thereby reducing the change of an internal short-circuit, and as a result, the cycle life of the sealed lead-acid battery can be prolonged. In this case, a paste type electrode using not only a cast grid with an outer frame, but also using the expanded grid without an outer frame on both edges, is adopted for the positive and negative electrodes, and the battery is exposed to violent forces such as vibration, shock, acceleration, and charge and deep discharge.

The present invention dramatically improves the performance of the sealed lead-acid battery, and reduces maintenance of car batteries as well as EV batteries.

What is claimed is:

1. A sealed lead-acid battery comprising an electrode group which comprises:
    (a) a tubular separator made from a hydrophilic treated cloth made from a synthetic fiber,
    (b) two electrodes of the same polarity inserted into said tubular separator so that lower ends thereof become adjacent to one another,
    (c) glass fiber separator portions in contact with an outside surface of said tubular separator, and
    (d) an electrode opposite in polarity to said two electrodes having one of said glass fiber separator portions on each side thereof upon folding of said tubular separator.

2. A sealed lead-acid battery comprising an electrode group which comprises:
    (a) a tubular separator made from hydrophilic treated cloth made from synthetic fiber,
    (b) two electrodes of the same polarity inserted into said tubular separator so that lower ends thereof become adjacent to one another,
    (c) at least one glass fiber separator made from fine glass fibers, said at least one glass fiber separator being in contact with an outside surface of said tubular separator,
    wherein said at least one glass fiber separator is one of a) a doubled-back "U" shape member and b) two glass fiber separators, and
    (d) an electrode opposite in polarity to said two electrodes having said glass fiber separator on each side thereof upon folding of said tubular separator.

3. A sealed lead-acid battery comprising an electrode group which comprises:
    (a) a tubular separator made from hydrophilic treated cloth made from synthetic fiber,
    (b) two electrodes of the same polarity inserted into said tubular separator so that lower ends thereof become adjacent,
    (c) at least one separator made from fine glass fibers either doubled-back to form a "U" shape or provided in two pieces, said two electrodes being in contact with the inside surface of said tubular separator, and
    (d) an electrode opposite in polarity to said two electrodes having said glass fiber separator on each side thereof upon folding of said tubular separator.

4. A sealed lead-acid battery comprising:
    a tubular separator;
    two electrodes of the same polarity inserted into said tubular separator so that lower ends of said electrodes are proximal to one another;
    an opposite electrode; and
    a separator adjacent to facing surfaces of said opposite electrode;

said tubular separator being folded to at least partially surround said opposite electrode and said separator.

5. The sealed lead-acid battery as recited in claim 4, wherein said separator is folded into position adjacent to said facing surfaces of said opposite electrode.

6. The sealed lead-acid battery as recited in claim 4, wherein said separator comprises a piece positioned adjacent to each of said facing surfaces of said opposite electrode.

* * * * *